United States Patent [19]

Reith et al.

[11] 3,989,771
[45] Nov. 2, 1976

[54] RUBBERMODIFIED STYRENE POLYMERS
[75] Inventors: Robert A. Reith, Glen Ellyn; James Spanswick, Wheaton, both of Ill.
[73] Assignee: Standard Oil Company (Indiana), Chicago, Ill.
[22] Filed: Apr. 30, 1975
[21] Appl. No.: 573,309

[52] U.S. Cl. .......................... 260/880 R; 260/878 R
[51] Int. Cl.² ............................................. C08L 9/06
[58] Field of Search ................ 260/3.5, 879, 880 R, 260/878 R

[56] References Cited
UNITED STATES PATENTS
3,293,226  12/1966  de Schrijver ........................ 260/879

3,503,905  3/1970  Zuern ............................... 260/880 R
3,639,522  2/1972  Narayana ......................... 260/880 R Primary Examiner—Paul R. Michl
Attorney, Agent, or Firm—Wallace L. Oliver; Arthur G. Gilkes; William T. McClain

[57] ABSTRACT

Addition of very small amounts of bromine or bromine-containing compounds in the preparation of rubber-modified vinyl aromatic polymers increase their impact resistance.

12 Claims, No Drawings

RUBBERMODIFIED STYRENE POLYMERS

BACKGROUND OF THE INVENTION

This invention relates to increasing the impact resistance in rubber-modified vinyl aromatic polymers and more particularly to the addition of small quantities of bromine-containing compounds to styrene polymers in order to enhance impact strength.

The desirability of producing higher impact resistant grades of styrene polymer is well known in the art. Compositions and methods have been developed which produce high impact polystyrene by the incorporation of a rubber-polystyrene discrete phase into a polystyrene matrix. Possible impact modifiers for styrene polymers include polybutadiene rubber (PBD), styrene-butadiene rubber (SBR) and ethylene-propylene-diene monomer rubber (EPDM). Such rubbers are found in concentrations from three to ten percent. There is a need for new techniques that increase the impact strength of various styrene based polymers. Especially, there is a need for a method of increasing the impact strength of EPDM-modified styrene polymers, since these polymers have inherently low impact strengths.

British Pat. No. 1,185,122 discloses the use of relatively high concentrations of $\beta$-bromostyrene in rubber-modified polystyrene as a means to prepare a transparent polymer, however there is no mention of an enhancement of impact strength nor were EPDM rubbers used.

SUMMARY OF THE INVENTION

Our invention is a method for producing an impact resistant polymer comprising:
a. adding to a polymerization feedstock, comprising 2 to 20% rubber dissolved in a vinyl aromatic monomer, an effective amount between 0.01 to 0.5 weight percent of an additive selected from the group consisting of bromine and carbon tetrabromide;
b. polymerizing the feedstock; and
c. recovering the polymer,
whereby the Izod value of the polymer is at least 0.6.

DETAILED DESCRIPTION OF THE INVENTION

We have found that small amounts of bromine or bromine-containing compounds when added to rubber-modified vinyl aromatic polymers during their preparation will enhance their impact resistance. The preferred polymer is prepared from styrene monomer. Generally, in the preparation of impact resistant grade styrene polymers, a styrene-rubber solution or emulsion is polymerized resulting in discrete rubber-polystyrene particles in a matrix of polystyrene. The impact resistance of the final polymer is dependent upon such variables as the rubber type, the size of the discrete phase, the amount of rubber used, the adhesion between the two phases, crosslinking within the rubber phase and the molecular weight of the matrix. Usually in order to obtain an increase in reinforcement, more rubber is added to the feedstock, however, as the amount of rubber is increased the ability of the rubber to be dispersed within the polystyrene diminishes.

We have found that there is an enhancement of impact resistance when very low levels of bromine or bromine-containing additives are employed. This means that for a given level of rubber in the feedstock, styrene polymers of greater impact resistance can be prepared. Conversely, for a given impact resistance a lower rubber level can be used, resulting in a saving in raw material cost. Specifically, we find that the addition of carbon tetrabromide in small amounts to a rubber modified polystyrene increases the impact strength of the product.

The level of bromine or bromine-containing compound should be under 0.5% (by weight) and preferably under 0.1%, although even lower levels can be used quite effectively. The optimum concentration of additive apparently varies with the specific additive used. Thus, the optimum amount for one bromine-containing substance may not be the same as for another bromine compound. The impact resistance enhancement effect is observed in rubber-modified styrene polymers when the bromine compound is added in amounts greater than about 0.01%. As the additive concentration is increased there is increased enhancement up to a maximum effective amount after which point the impact resistance decreases.

Although the addition of bromine or bromine-containing additive to the styrene polymer feedstock improves the translucency of the product, the amount of additive required for optimum translucency is greater than the amount needed for optimum impact strength.

Among bromine-containing additives, the specific examples include carbon tetrabromide, $\beta$-bromostyrene, $\alpha$-bromostyrene, 4-bromostyrene, $\beta$-bromo-$\alpha$-methylstyrene, $\beta$-bromoethylmethyacrylate, $\alpha, \beta$-dibromo-$\alpha$-methylethylbenzene and the like. The preferred bromine-containing additive is carbon tetrabromide.

Our invention can be practiced in a variety of conventional polymerization techniques using various rubber modifiers, including mass thermal and mass suspension. Specifically, our invention is useful when the polymerization technique is the mass thermal polymerization technique. Typically, polymer is recovered by removing polymerized material from a reactor either continuously or batchwise, devolatilizing the polymer to remove traces of nonpolymierized material, and usually chopping or grinding the polymer into convenient particle size.

Rubbers which can be used include PBD, SBR, and EPDM rubbers. Typically, useful PBD rubbers are linear and branched polymers of butadiene containing from 25 to 99% cis content with less than 20% free vinyl unsaturation (i.e., 1, 2-addition). A commonly used PBD would contain 58% trans, 27% cis and 15% free vinyl unsaturation. Solution viscosities for useful PBD's range from 25 to 220 centipoise and preferably range from 70 to 190 centipoise measured at a concentration of 5% by weight in styrene at 30° C. Useful SBR rubbers are random or block copolymers of butadiene and styrene, combination thereof, with 5 to 50% bound styrene. Typical solution viscosities are 20 to 190 centipoise and typical Mooney viscosities are 30 to 120. Mooney viscosities for useful EPDM rubbers are typically from 30 to 120 and preferably about 60. These rubbers can be present in styrene polymers at levels from about 2 to 20% and typically from about 3 to 10%.

In addition to the vinyl aromatic monomer and rubber, up to about 10% of other materials can be included in the polymerization feedstock, such as stabilizers, antioxidants, colorants, flame retardants, and lubricants.

Rubber-modified styrene polymers were produced using the mass thermal bulk polymerization technique and a solution of 4% Firestone Diene 55, a solution PBD, in styrene monomer plus certain bromine containing compounds. In this technique styrene, rubber and additives were placed in an agitated ½ gallon Chemco reactor for about 6 to 9 hours during which time the temperature ranged from about 120° to 210° C. Polymer was recovered by removing the material from the reactor, grinding it, and passing it through a devolatilizing extruder.

The results are summarized in TABLE I. Similarly prepared polymers without bromine-containing compounds would have Izod values ranging from 0.5 to 1.0.

additive. The resulting data are summarized in TABLE III.

Our invention is effective especially for EPDM modified styrene polymers. In EPDM rubber the unsaturation is usually low and external to the polymer backbone. Although this structure makes it more resistant to degradation, it is difficult to graft polystyrene onto EPDM rubber by usual polymerization processes. Since graft copolymerization provides adhesion between the rubber phase and the matrix, impact resistance is usually low. Attempts at producing a EPDM reinforced styrene polymer using conventional techniques yields a product with an Izod value of about 0.3, a value unacceptable for commercial use.

TABLE I

| Run | Bromine-Containing Additive | % Additive | Izod[1] (ft-lb/in of notch) | Yield[2] Tensile Strength (lb/in$^2$) | Ultimate[3] Tensile Strength (lb/in$^2$) | Elongation[4] (%) | Heat[5] Distortion Temp (° F.) | Melt[6] Flow Rate (g/10 min) |
|---|---|---|---|---|---|---|---|---|
| 1 | 4-bromostyrene | 0.5% | 1.12 | 5000 | 4932 | 42.1 | 186 | 2.4 |
| 2 | β-bromo-α-methylstyrene | 0.015% | 0.9 | 4800 | 4950 | 36.5 | 183 | 2.8 |
| 3 | 2-bromoethylbenzene | 0.05% | 1.21 | 5300 | 5050 | 35.2 | 189 | 2.8 |
| 4 | α,β-dibromoethylbenzene | 0.05% | 0.86 | 4400 | 4800 | 39.4 | 174 | 4.6 |
| 5 | β-bromostyrene | 0.025% | 1.1 | 4800 | 4900 | 39.7 | 181 | 3.7 |
| 6 | methyl-α,βdibromophenyl-propionate | 0.025% | 0.9 | 4600 | 4900 | 41.3 | 179 | 3.9 |
| 7 | none | — | 0.92 | 3100 | 3700 | 36.0 | 179 | 8.3 |
| 8 | none | — | 0.71 | 4400 | 3800 | 32.0 | 180 | 6.0 |

[1]ASTM D256-70 (¼ in bar)
[2]ASTM D638-68 (Type I at 0.2 in/min)
[3]ASTM D638-68 (Type I at 0.2 in/min)
[4]ASTM D638-68 (Type I at 0.2 in/min)
[5]ASTM D648-58 (¼in bar at 264 psi)
[6]ASTM D1238-70 (Condition G)

Polymers were prepared using 8% Diene 55 in styrene in a similar manner as above. Runs were performed with and without using carbon tetrabromide. These results are summarized in TABLE II.

The addition of very small amounts of bromine or carbon tetrabromide to a feedstock containing EPDM rubber dissolved in styrene monomer and subsequent

TABLE II

| Example (Run) | ppm CBr$_4$ in Feedstock | Izod (Notched) (ft-lb/in of notch) | Yield Tensile Strength (lb/in$^2$) | Ultimate Tensile Strength (lb/in$^2$) | Elongation (%) | Heat Distortion Temp (° F) | Melt Flow Rate (g/10 min) |
|---|---|---|---|---|---|---|---|
| Run 9 | 0 | 2.0 | 2738 | 2940 | 56 | 179 | 2.7 |
| Run 10 | 0 | 1.9 | 3355 | 3158 | 34 | 178 | 6.2 |
| Ex. I | 491 | 2.6 | 3256 | 3121 | 44 | 164 | 1.2 |
| Ex. II | 491 | 3.0 | 3284 | 3167 | 48 | 156 | 1.8 |

In evaluating our invention in EPDM rubber modified styrene polymers, a series of runs was performed using a laboratory scale mass thermal apparatus. Approximately 2000 grams of rubber-styrene monomer were charged into the reactor and the polymerization continuing at temperatures ranging from about 110° to 210° C with agitation for 6 to 9 hours. The feedstock contained 8% (by weight) Royalene 505 EPDM Rubber and 8C 92% styrene monomer in addition to any mass thermal polymerization yields an impact resistant styrene polymer. Apparently the bromine or bromine-containing compound alters the grafting, crosslinking and/or morphology is such a manner as to enhance reinforcement. Feedstocks which do not contain these additives do not yield products with increased Izod values. Surprisingly, even the addition of a known peroxy free radical initiator which should promote grafting and crosslinking does not enhance the product's impact strength.

TABLE III

| Example (Run) | Additive | Concentration (ppm) | Izod (ft-lb/in of notch) | Elongation (%) | MEK[1] Insolubles (%) |
|---|---|---|---|---|---|
| Ex. III | CBr$_4$ | 500 | 0.7 | 20.1 | 13.1 |
| Ex. IV | Bromine[2] | 500 | 0.9 | 2.8 | 11.9 |
| Run 11 | — | — | 0.3 | 3.2 | 9.8 |
| Run 12 | t-butyl perbenzoate | 351 | 0.3 | 3.5 | 9.4 |
| Run 13 | t-butyl perbenzoate | 351 | 0.3 | 2.7 | 10.1 |
| Run 14 | 1-t-butylazo-1-methoxycyclo- | 469 | 0.3 | 1.9 | 8.2 |

TABLE III-continued

| Example (Run) | Additive | Concentration (ppm) | Izod (ft-lb/in of notch) | Elongation (%) | MEK[1] Insolubles (%) |
|---|---|---|---|---|---|
| | hexane | | | | |

[1]methyl ethyl ketone
[2]added dropwise directly into the feedstock

The Izod impact strength of the products prepared with bromine or $CBr_4$ added to the feedstock is substantially greater than products prepared in a similar manner but without any bromine or $CBr_4$ additive. Even products containing t-butyl perbenzoate or t-butylazo-1-methoxy-cyclohexane, which are low and high temperature free radical initiators respectively, do not show increased impact strength under similar polymerization conditions. Furthermore, the higher methyl ethyl ketone insoluble content of the polymers using our invention suggests that the grafting, crosslinking and/or morphology of the rubber phase was effected by the additives.

In summary, the invention provides a convenient method for increasing the impact strength of rubber-modified styrene polymers by adding very small amounts of bromine or bromine containing additives to the polymerization feedstock. The invention is especially effective in producing impact resistant EPDM-modified styrene polymers using bromine or carbon tetrabromide as additives.

We claim:
1. A method for producing an impact resistant polymer comprising:
   a. adding to a polymerization feedstock, comprising 2 to 20% polybutadiene, styrene-butadiene or ethylene-propylene-diene monomer rubber dissolved in a vinyl aromatic monomer, an effective amount between 0.01 to 0.5 weight percent of an additive selected from the group consisting of bromine and carbon tetrabromide;
   b. polymerizing the feedstock; and
   c. recovering the polymer,
   whereby the Izod value of the polymer is at least 0.6.
2. The method of claim 1 where the vinyl aromatic monomer is styrene monomer.
3. The method of claim 2 where the feedstock is polymerized by the mass thermal polymerization technique.
4. The method of claim 3 where the additive is carbon tetrabromide.
5. The method of claim 3 where the additive is bromine.
6. The method of claim 3 where the rubber is EPDM rubber.
7. The method of claim 6 where the additive is bromine.
8. The method of claim 6 where the additive is carbon tetrabromide.
9. The product formed using the method of claim 5.
10. The product formed using the method of claim 7.
11. The product formed using the method of claim 6.
12. The product formed using the method of claim 8.

* * * * *